(12) United States Patent
Lee

(10) Patent No.: US 7,632,026 B2
(45) Date of Patent: Dec. 15, 2009

(54) CAMERA MODULE AND MOBILE TERMINAL HAVING THE SAME

(75) Inventor: Jin Ho Lee, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 250 days.

(21) Appl. No.: 11/737,974

(22) Filed: Apr. 20, 2007

(65) Prior Publication Data
US 2007/0248355 A1 Oct. 25, 2007

(30) Foreign Application Priority Data
Apr. 21, 2006 (KR) .................... 10-2006-0036039

(51) Int. Cl.
*G03B 17/00* (2006.01)
*G02B 7/02* (2006.01)
(52) U.S. Cl. ...................... 396/529; 359/819
(58) Field of Classification Search ............ 396/529, 396/535, 541; 348/340, 373–376; 250/239; 359/819; 257/433
See application file for complete search history.

(56) References Cited
U.S. PATENT DOCUMENTS

| | | | |
|---|---|---|---|
| 5,768,649 A * | 6/1998 | Pearson | 396/529 |
| 6,813,099 B2 * | 11/2004 | Yamaguchi | 359/779 |
| 6,898,030 B1 * | 5/2005 | Lin et al. | 359/819 |
| 2001/0050717 A1 * | 12/2001 | Yamada et al. | 348/340 |
| 2005/0242410 A1 * | 11/2005 | Groot et al. | 257/433 |

* cited by examiner

*Primary Examiner*—Melissa J Koval
*Assistant Examiner*—Minh Q Phan
(74) *Attorney, Agent, or Firm*—Saliwanchik, Lloyd & Saliwanchik

(57) ABSTRACT

Provided are embodiments of a camera module and a mobile terminal having the same. In embodiments, the manufacturing process may be simplified, a defect ratio may be reduced, and product reliability may be improved. The camera module can include a lens assembly, an image sensor formed below the lens assembly, a lens holder covering the image sensor and coupled to the lens assembly, a substrate having a groove corresponding to a shape of a lower surface of the lens holder to allow the lens holder to be inserted and fixed in the groove, and a curing adhesive for attaching the substrate to the lens holder. In an embodiment, the curing adhesive can be an ultra-violet curing adhesive.

17 Claims, 4 Drawing Sheets

CAMERA MODULE AND MOBILE TERMINAL HAVING THE SAME

CROSS-REFERENCE TO RELATED APPLICATION

The present application claims the benefit under 35 U.S.C. §119 to Korean Patent Application No. 10-2006-0036039, filed Apr. 21, 2006, which is hereby incorporated by reference in its entirety.

BACKGROUND

The present document relates to a camera module.

A camera module is a means for obtaining an image. A camera module may be adapted to a mobile terminal. Therefore, utility of a mobile terminal may be extended. Here, a mobile terminal includes not only mobile phones but also a variety of wireless communication devices.

A camera module typically includes a lens assembly, a lens holder coupled to the lens assembly, and a substrate for supporting the lens holder. The coupling structure between the above-mentioned elements may be modified in various ways when the camera module is manufactured. Also, a variety of methods for coupling the elements may be proposed in manufacturing the camera module.

Time consumed during the manufacturing process of a camera module may change and the product defect rate may change depending on the coupling structure of the camera module. Accordingly, a study on a camera module that may shorten the manufacturing time and reduce the product defect rate is under active development.

SUMMARY

An embodiment of the present invention relates to a camera module.

Another embodiment of the present invention provides a camera module and a mobile terminal having the same, capable of simplifying the manufacturing process, reducing the defect ratio, and improving reliability of the product.

An embodiment of the present invention provides a camera module including: a lens assembly; an image sensor formed below the lens assembly; a lens holder covering the image sensor and coupled to the lens assembly; a substrate having a groove corresponding to a shape of a circumference of a lower surface of the lens holder to allow the lens holder to be inserted and fixed in the groove; and a curing adhesive for attaching the substrate to the lens holder.

A further embodiment of the present invention provides a mobile terminal including: a camera module; a communication unit for communicating with the outside; and a control unit for controlling the communication unit and the camera module. The camera module includes a lens assembly, an image sensor formed below the lens assembly, a lens holder covering the image sensor and coupled to the lens assembly, a substrate having a groove corresponding to a shape of a circumference of a lower surface of the lens holder to allow the lens holder to be inserted and fixed in the groove, and a curing adhesive for attaching the substrate to the lens holder.

DETAILED DESCRIPTION

Reference will now be made in detail to embodiments according to the present invention, examples of which are illustrated in the accompanying drawings.

Figure 1:
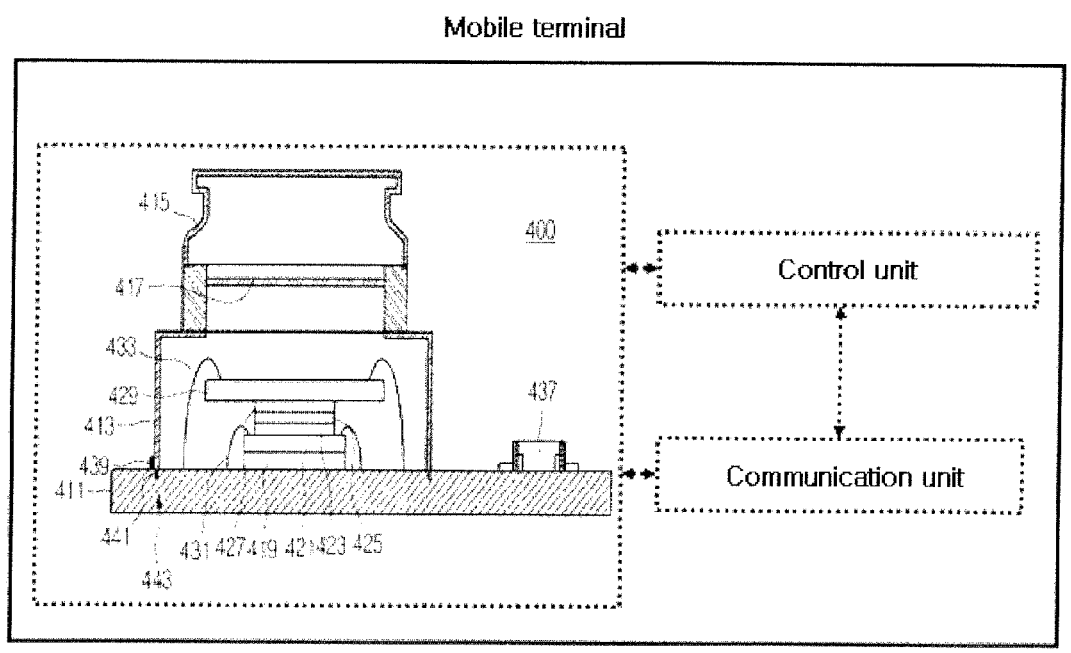
FIG. 1 is a schematic view illustrating a camera module according to an embodiment of the present invention.
Figure 2:
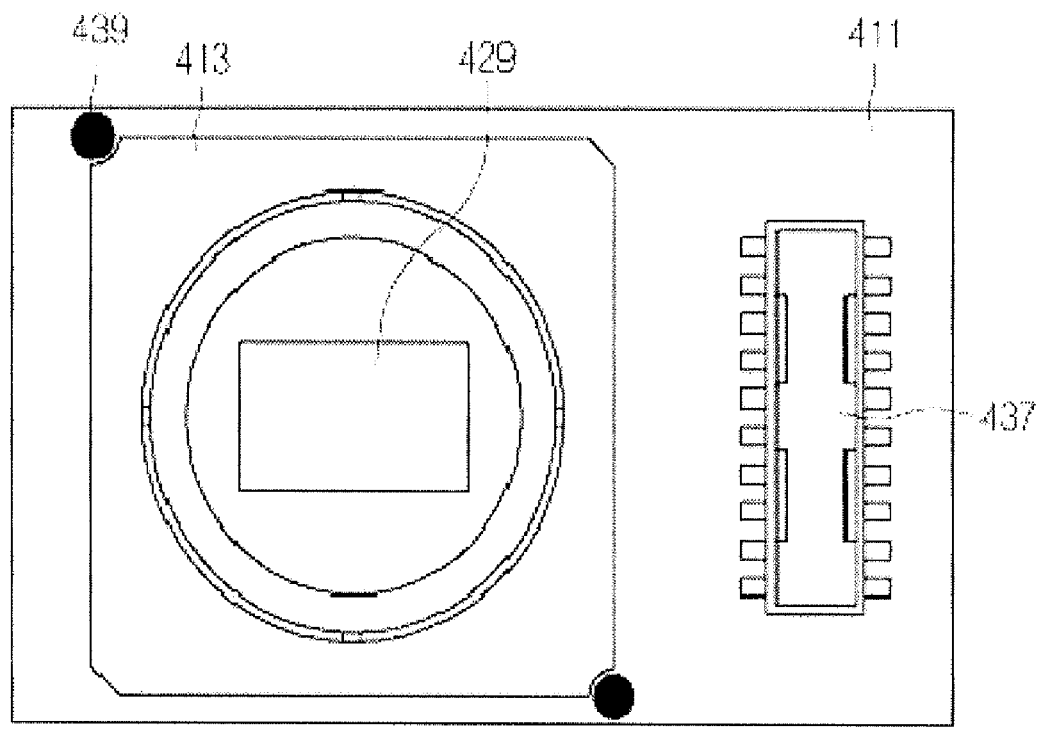
FIG. 2 is a schematic plan view of a camera module according to an embodiment of the present invention.
Figure 3:
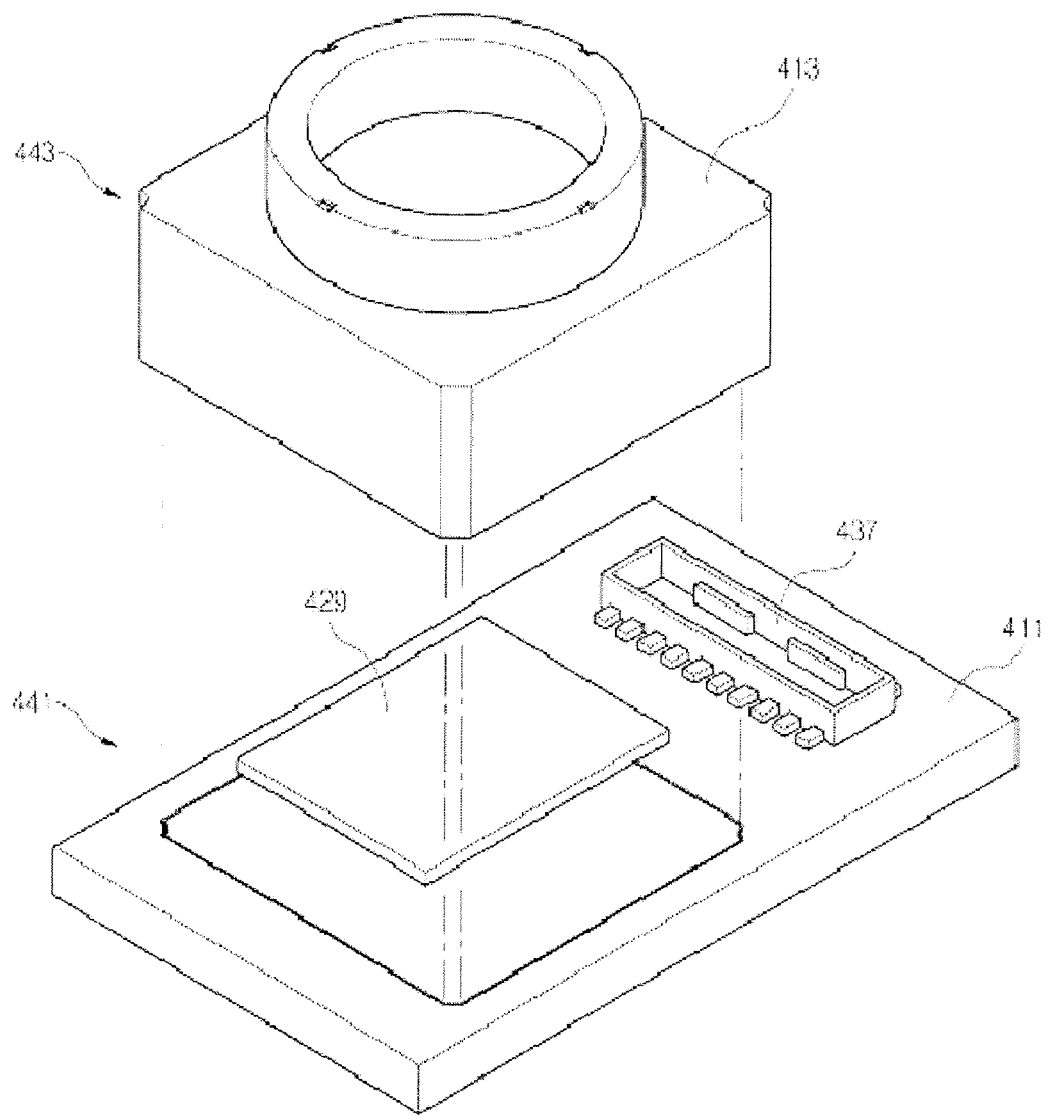
FIG. 3 is an exploded perspective view of a camera module according to an embodiment of the present invention.
Figure 4:
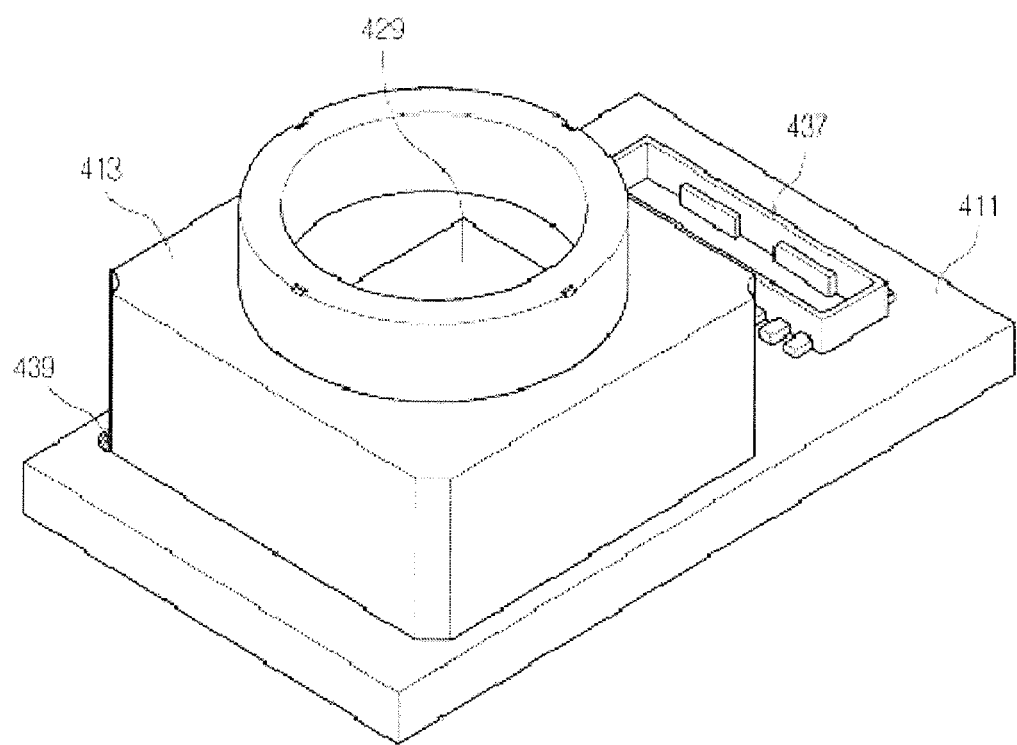
FIG. 4 is a view explaining a structure in which a lens holder is coupled on a substrate in a camera module according to an embodiment of the present invention.

FIG. 1 is a schematic view illustrating a camera module according to an embodiment of the present invention, FIG. 2 is a schematic plan view of a camera module according to an embodiment of the present invention, FIG. 3 is an exploded perspective view of a camera module according to an embodiment of the present invention, and FIG. 4 is a view explaining a structure in which a lens holder is coupled on a substrate in a camera module according to an embodiment of the present invention.

Referring to FIG. 1, a camera module 400 can include a substrate 411, a lens holder 413, a lens assembly 415, an image signal processor (ISP) 421, and an image sensor 429.

The image sensor 429 may be formed below the lens assembly 415. The lens holder 413 may cover the image sensor 429. And the lens holder 413 may be coupled to the lens assembly 415. The shape of the lens assembly 415 may be modified in various ways. The present embodiment illustrates a lens assembly 415 formed in a circular shape. Accordingly, the upper portion of the lens holder 413 coupled to the lens assembly 415 can be formed in a circular shape. The ISP 421 can be formed on a substrate 411 to process an image obtained by the image sensor 429.

The ISP 421 and the image sensor 429 may be stacked on the substrate 411. The substrate can be, for example, a printed circuit board (PCB). Also, a passive part and a connector 437 may be formed on the substrate 411. Examples of a passive part can include a multi-layer ceramic capacitor (MLCC) and a resistor. The connector 437 can be designed for transmitting a signal to the outside. The lens assembly 415 can be coupled to the lens holder 413. The lens holder 413 may include an infrared (IR) cut-off filter 417 for blocking infrared rays.

A groove 441 may be formed in the substrate 411. The lens holder 413 can be coupled in the groove 441. For this purpose, the groove 441 can be formed to correspond to a circumference shape of a lower surface of the lens holder 413 so that the lens holder 413 may be coupled in the groove 441. The lens holder 413 can be inserted and fixed in the groove 441 formed in the substrate 411.

Also, as illustrated in FIG. 3, at least one concave surface 443 may be formed on an outer portion of the lens holder 413. A curing adhesive 439, for example, an ultraviolet (UV) curing adhesive can be provided on a region where the concave surface 443 has been formed. For example, the concave surface 443 may be formed on an outer wall of the edge of the lens holder 413. The curing adhesive 439 may be coated in a space secured by the concave surface 443. The curing adhesive 439 coated on the concave surface 443 can be used to attach the lens holder 413 to the substrate 411 more stably.

The camera module 400 according to an embodiment of the invention may be manufactured through the following assembly process. The image signal processor 421 on which a first bonding film 419 has been attached can be attached on the substrate 411 using the first bonding film 419. A first curing process can be performed to secure the image signal processor 421 to the substrate 411. Then, a first bonding wire 431 for electrical connection between the ISP 421 and the substrate 411 can be formed.

Also, a spacer 425 on which a second bonding film 423 has been attached can be attached on the ISP 421 using the second bonding film 423. A second curing process can be performed to secure the spacer 425 to the ISP 421. Epoxy 427 for adhesion is coated on the spacer 425, and the image sensor 429, for example, a complementary metal oxide semiconductor image sensor (CIS) can be attached to the spacer 425 using the epoxy 427. Then, a second bonding wire 433 for electrical connection between the image sensor 429 and the substrate 411 can be formed. The above-described bonding is generally called stack bonding.

The lens holder 413 can be coupled on the substrate 411. The lower surface of the lens holder 413 can be inserted and fixed in the groove 441 formed in the substrate 411. The groove 441 of the substrate 411 can have a shape corresponding to that of the circumference of the lower surface of the lens holder 413. Accordingly, the lens holder 413 may be inserted and fixed in the groove 441.

A curing adhesive 439 can be coated on the concave surface 443 formed on the lens holder 413. Examples of the curing adhesive 439 include an UV curing adhesive. When using an UV curing adhesive, stable curing can be performed simply by illuminating UV rays without heat treatment. The lens assembly 415 can be coupled to the lens holder 413. In an embodiment, the lens assembly 415 can be coupled to the lens holder 413 after the lens holder 413 is fixed to the substrate 411.

According to an embodiment of the invention, the curing adhesive 439 may be stably cured merely by illuminating UV rays without performing a heat treatment during a process of fixing the lens holder 413 on the substrate 411. Therefore, a defect where a thermally curing adhesive runs down on the lateral side of a substrate can be inhibited from occurring. Since a heat treatment is not required to be performed in curing the curing adhesive 439, the process time can be reduced. Also, according to an embodiment of the invention, since heat treatment using an oven is not required, deformation of a camera module caused by the heat treatment can be reduced or prevented.

In the camera module 400 according to an embodiment of the invention, the lens holder 413 may be inserted and fixed in the groove 441 formed in the substrate 411. Accordingly, a gap can be inhibited from being generated in a coupling region between the lens holder 413 and the substrate 411. Also, an inner space formed by coupling of the lens assembly 415 and the lens holder 413, and coupling of the lens holder 413 and the substrate 411 can be isolated and sealed from the outside. Therefore, inflow of fine dusts to the inner space from the outside can be reduced or prevented. According to an embodiment of the invention, image performance reduction of the camera module 400 caused by inflow of fine dusts can be reduced.

A camera module according to an embodiment of the invention may be applied to a variety of mobile terminals. The mobile terminal can include not only mobile phones but also a variety of wireless communication devices.

Examples of a mobile terminal can include mobile communication terminals in which a camera module is mounted, digital cameras, and complex terminals in which a camera module is mounted. Generally, the mobile terminal includes a separate communication unit to perform voice communication with the outside. Also, an image obtained by the camera module may be transmitted to the outside via the communication unit. Here, the mobile terminal may further include a control unit for controlling the communication unit and the camera module.

A camera module and a mobile terminal having the same according to an embodiment of the invention may simplify a manufacturing process, reduce a defect rate, and improve reliability of a product.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments may be devised by those skilled in the art that will fall within the spirit and scope of the principle of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
a lens assembly;
an image sensor disposed below the lens assembly;
a lens holder covering the image sensor and coupled to the lens assembly;
a substrate having a groove corresponding to a shape of a lower surface of the lens holder to allow the lens holder to be inserted and fixed in the groove; and
a curing adhesive for attaching the lens holder to the substrate,
wherein a portion of the lens holder that is inserted and fixed in the groove comprises at least one concave surface that positions within the groove from the top surface of the groove along an interior surface of the groove when fixed in the groove.

2. The camera module according to claim 1, further comprising an image signal processor for processing an image obtained by the image sensor.

3. The camera module according to claim 1, wherein the curing adhesive is provided on the at least one concave surface.

4. The camera module according to claim 3, wherein a concave surface of the at least one concave surface is formed on at least one edge of the lens holder.

5. The camera module according to claim 1, wherein the curing adhesive means includes an ultraviolet curing adhesive.

6. The camera module according to claim 1, further comprising an infrared cut-off filter provided with the lens holder.

7. A mobile terminal comprising:
a camera module including:
a lens assembly,
an image sensor disposed below the lens assembly,
a lens holder covering the image sensor and coupled to the lens assembly, a substrate having a groove corresponding to a shape of a lower surface of the lens holder to allow the lens holder to be inserted and fixed in the groove, and a curing adhesive for attaching the lens holder to the substrate;

a communication unit for communicating with the outside; and a control unit for controlling the communication unit and the camera module, wherein a portion of the lens holder that is inserted and fixed in the groove comprises at least one concave surface that positions within the groove from the top surface of the groove along an interior surface of the groove when fixed in the groove.

8. The mobile terminal according to claim 7, wherein the curing adhesive is provided on the concave surface.

9. The mobile terminal according to claim 8, wherein a concave surface of the at least one concave surface is formed on at least one edge of the lens holder.

10. The mobile terminal according to claim 7, wherein the curing adhesive includes an ultraviolet curing adhesive.

11. The mobile terminal according to claim 7, further comprising an infrared cut-off filter provided with the lens holder.

12. The mobile terminal according to claim 7, wherein the groove comprises a protrusion that fits with a corresponding one of the at least one concave surface.

13. The camera module according to claim 1, wherein the groove comprises a protrusion that fits with a corresponding one of the at least one concave surface.

14. The camera module according to claim 1, wherein the lens holder has four sides, and wherein the at least one concave surface comprises four concave surfaces, each concave surface disposed along an edge between two adjacent sides of the lens holder.

15. The mobile terminal according to claim 7, wherein the lens holder has four sides, and wherein the at least one concave surface comprises four concave surfaces, each concave surface disposed along an edge between two adjacent sides of the lens holder.

16. The camera module according to claim 1, wherein the portion of the lens holder that is inserted and fixed in the groove has a shape of a cylindrical segment of a cylinder cut with a plane parallel to its longitudinal axis.

17. The mobile terminal according to claim 7, wherein the portion of the lens holder that is inserted and fixed in the groove has a shape of a cylindrical segment of a cylinder cut with a plane parallel to its longitudinal axis.

* * * * *